(12) United States Patent
Liao et al.

(10) Patent No.: US 9,746,980 B2
(45) Date of Patent: *Aug. 29, 2017

(54) CAPACITIVE FINGER NAVIGATION MODULE AND MANUFACTURING METHOD THEREOF

(71) Applicant: PIXART IMAGING INC., Hsin-Chu County (TW)

(72) Inventors: Chi-Chieh Liao, Hsin-Chu County (TW); Yi-Hsien Ko, Hsin-Chu County (TW); Chih-Hsiung Shih, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/337,555

(22) Filed: Oct. 28, 2016

(65) Prior Publication Data

US 2017/0045969 A1    Feb. 16, 2017

Related U.S. Application Data

(63) Continuation of application No. 14/591,150, filed on Jan. 7, 2015, now Pat. No. 9,552,118.

(30) Foreign Application Priority Data

Feb. 24, 2014 (TW) ............... 103106202 A
Jun. 24, 2014 (TW) ............... 103121831 A

(51) Int. Cl.
*G06F 3/044* (2006.01)
*G06F 3/0338* (2013.01)
*G06F 3/041* (2006.01)

(52) U.S. Cl.
CPC ............ *G06F 3/044* (2013.01); *G06F 3/0338* (2013.01); *G06F 3/0416* (2013.01); *G06F 2203/04102* (2013.01); *G06F 2203/04103* (2013.01); *G06F 2203/04105* (2013.01); *Y10T 29/49155* (2015.01)

(58) Field of Classification Search
CPC ............................. G06F 3/044; G06F 3/0338
USPC ......................................................... 345/174
See application file for complete search history.

(56) References Cited

U.S. PATENT DOCUMENTS

| 9,228,907 | B2 | 1/2016 | Salo et al. |
| 2005/0005703 | A1 | 1/2005 | Saito et al. |
| 2006/0007179 | A1 | 1/2006 | Pihlaja |
| 2006/0146019 | A1 | 7/2006 | Ahlgren et al. |
| 2011/0018556 | A1 | 1/2011 | Let et al. |
| 2011/0080373 | A1 | 4/2011 | Wang et al. |
| 2012/0313627 | A1 | 12/2012 | Furukawa et al. |
| 2013/0126325 | A1 | 5/2013 | Curtis et al. |
| 2013/0155276 | A1 | 6/2013 | Ueda |
| 2013/0201151 | A1 | 8/2013 | Takashima et al. |
| 2013/0234977 | A1 | 9/2013 | Lin et al. |

(Continued)

FOREIGN PATENT DOCUMENTS

| CN | 102339179 A | 2/2012 |
| TW | 201205404 A1 | 2/2012 |

*Primary Examiner* — Fred Tzeng
(74) *Attorney, Agent, or Firm* — Hauptman Ham, LLP

(57) ABSTRACT

A capacitive finger navigation module including a pressure detection mode and a finger movement detection mode is provided. In the pressure detection mode, a finger press is detected to generate a continuous cursor movement signal. In the finger movement detection mode, a finger movement is detected to generate a single cursor movement signal.

20 Claims, 10 Drawing Sheets

(56) References Cited

U.S. PATENT DOCUMENTS

2014/0267129 A1 9/2014 Rebeschi et al.
2014/0327645 A1 11/2014 Matthews et al.

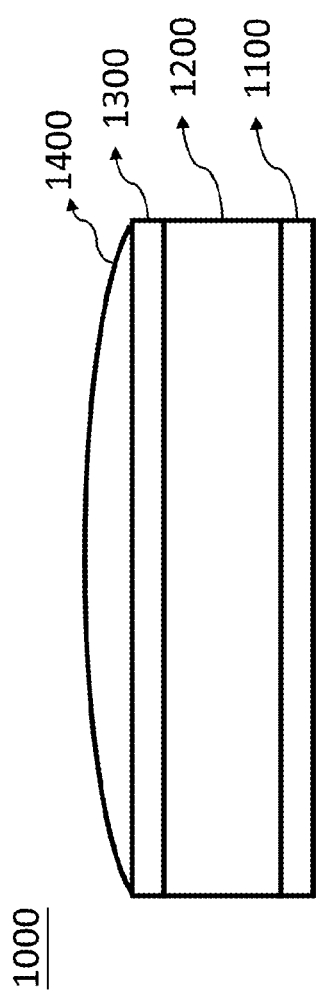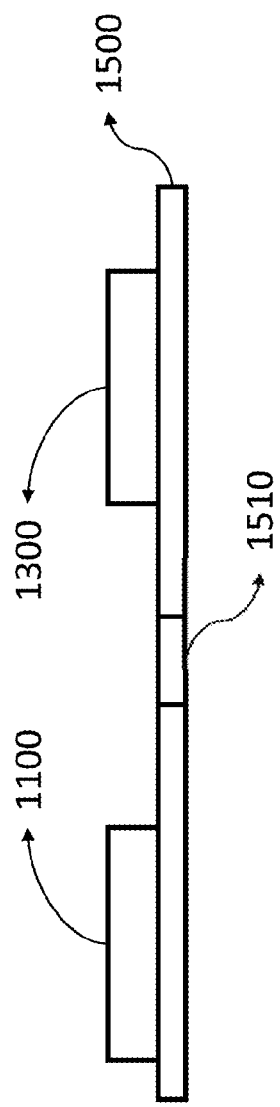

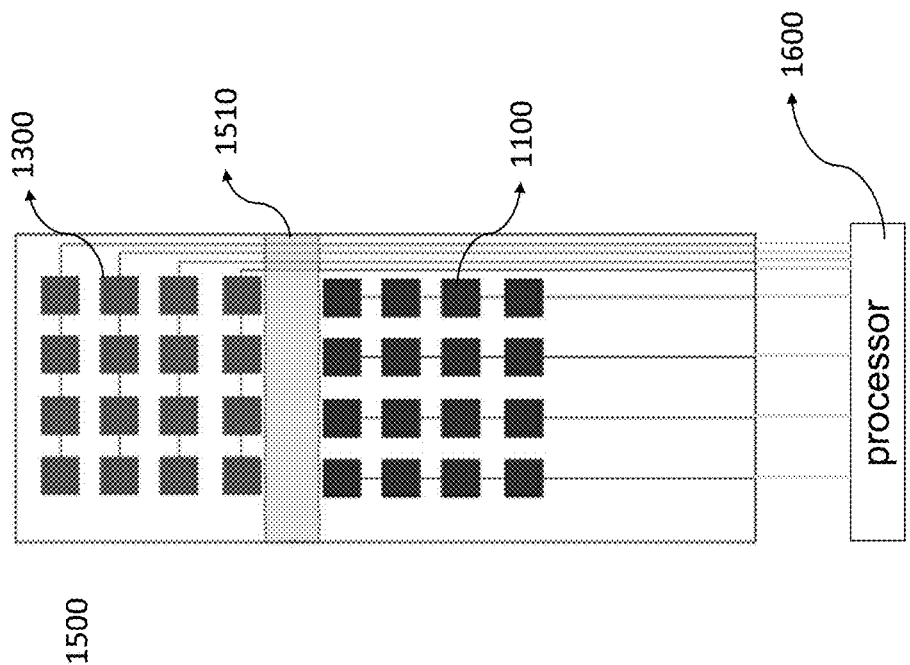
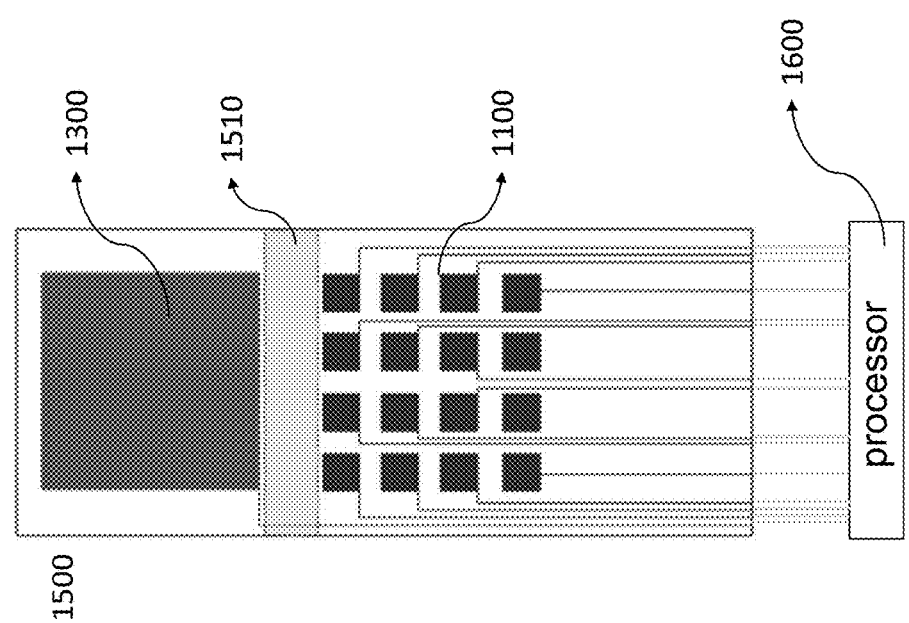

CAPACITIVE FINGER NAVIGATION MODULE AND MANUFACTURING METHOD THEREOF

RELATED APPLICATIONS

The present application is a continuation application of U.S. application Ser. No. 14/591,150, filed on Jan. 7, 2015, which claims priority to Taiwanese Application Number 103106202, filed Feb. 24, 2014 and Taiwanese Application Number 103121831, filed Jun. 24, 2014, the disclosures of which are hereby incorporated by reference herein in their entirety.

BACKGROUND

1. Field of the Disclosure

This disclosure generally relates to a capacitive finger navigation module and, more particularly, to a finger navigation module and a manufacturing method thereof having a pressure detection mode and a finger movement detection mode.

2. Description of the Related Art

The conventional finger navigation module generally operates by detecting the finger movement, i.e. determining a moving distance of a cursor according to the displacement of a finger on a detection surface of the finger navigation module. For example, if the finger moves a distance of three pixels on the detection surface of the finger navigation module, the cursor on a controlled screen correspondingly moves a distance of three units on a display.

In recent years, due to its convenience, the finger navigation module is gradually being applied to portable electronic devices, such as cell phones. Accordingly, the finger navigation module preferably has a small detection surface to be adaptable to the portable electronic devices. However, when a cursor position needs to be moved over a large scale, in order to continuously move the cursor, the finger has to continuously move to and fro on a detection surface of the finger navigation module due to the small area of the detection surface. But this could cause the user's inconvenience in operation.

SUMMARY

Accordingly, the present disclosure provides a capacitive finger navigation module and a manufacturing method thereof that may continuously detect the movement signal on a small detection surface.

The present disclosure provides a capacitive finger navigation module that may be manufactured simply.

The present disclosure further provides a capacitive finger navigation module that may respectively detect the movement signal and the press signal by means of the inductive capacitance change of different groups of inductive capacitors.

The present disclosure provides a capacitive finger navigation module including a contact layer, a first electrode layer, a second electrode layer and an elastic material layer. The contact layer is configured for providing a move operation and a press operation of a finger thereon. The first electrode layer includes at least one first electrode. The second electrode layer includes at least one second electrode and at least one third electrode. The elastic material layer is disposed between the first electrode layer and the second electrode layer, and configured to form a deformation in the press operation so as to change a distance between the first electrode layer and the second electrode layer, wherein in the press operation the first electrode and the second electrode are configured to generate a press signal according to a first inductive capacitance change, and in the move operation the second electrode and the third electrode are configured to generate a movement signal according to a second inductive capacitance change.

In one aspect, the capacitive finger navigation module is coupled to a processing unit which is configured to generate a continuous movement signal according to the press signal. The second electrode layer includes a plurality of sensing electrodes which are respectively configured to generate the press signal when the first inductive capacitance change exceeds a change threshold. The processing unit is further configured to determine a moving speed of the continuous movement signal according to an electrode number of the sensing electrodes generating the press signal, determine a moving direction of the continuous movement signal according to an electrode position of the sensing electrodes generating the press signal, and/or generate the continuous movement signal according to the press signal of a first part of the sensing electrodes and generate a click signal according to the press signal of a second part of the sensing electrodes.

The present disclosure further provides a capacitive finger navigation module including a contact layer, a sensing electrode layer, a driving electrode layer, an elastic material layer and a processing unit. The contact layer is configured for providing a press operation of a finger thereon. The sensing electrode layer includes a plurality of sensing electrodes. The driving electrode layer includes at least one driving electrode opposite to the sensing electrodes. The elastic material layer is disposed between the sensing electrode layer and the driving electrode layer, and configured to form a deformation in the press operation so as to change a distance between the sensing electrode layer and the driving electrode layer. The processing unit is configured to generate, in the press operation, a strength signal and a direction signal according to an inductive capacitance change sensed by the sensing electrodes.

In one aspect, the strength signal is configured to control a cursor moving speed and the direction signal is configured to control a cursor moving direction. The processing unit is configured to determine the strength signal according to an electrode number of the sensing electrodes with the inductive capacitance change exceeding a change threshold, and determine the direction signal according to an electrode position of the sensing electrodes with the inductive capacitance change exceeding the change threshold.

In one aspect, the processing unit is configured to generate the strength signal and the direction signal according to the inductive capacitance change sensed by a first part of the sensing electrodes, and to generate a click signal according to the inductive capacitance change sensed by a second part of the sensing electrodes.

The present disclosure further provides a manufacturing method of a capacitive finger navigation module including the steps of: providing a flexible board; respectively forming a first electrode layer and a second electrode layer on the flexible board; forming a plurality of traces on the flexible board to electrically connect to the first electrode layer and the second electrode layer; covering an elastic material layer on at least a part of the flexible board, the traces, the first electrode layer and the second electrode layer; and bending the flexible board to allow the first electrode layer to face the second electrode layer through the elastic material layer.

In one aspect, the second electrode is a driving electrode, and the first and third electrodes are sensing electrodes. In one aspect, the second electrode is a sensing electrode, and the first and third electrodes are driving electrodes.

In one aspect, the second electrode layer includes a plurality of second electrodes and a plurality of third electrodes. A part of the second electrodes have different areas from one another, and a part of the third electrodes have different areas from one another.

In the capacitive finger navigation module according to some embodiments of the present disclosure, a flexible board is provided to arrange the first electrode layer and the second electrode layer, and the capacitive finger navigation module is manufactured simply by bending the flexible board to allow the first electrode layer to opposite to the second electrode layer through the elastic material layer. In addition, by using different electrode groups, the finger press function and the finger moving function is realized simultaneously.

BRIEF DESCRIPTION OF THE DRAWINGS

Other objects, advantages, and novel features of the present disclosure will become more apparent from the following detailed description when taken in conjunction with the accompanying drawings.

FIG. 1 is a module structure according to one embodiment of the present disclosure.

FIG. 2A is a schematic diagram of a simple manufacturing method of the finger navigation module according to one embodiment of the present disclosure.

FIG. 3A is a schematic diagram of the electrode arrangement according to one embodiment of the present disclosure.

FIG. 3B is a schematic diagram of the electrode arrangement according to another embodiment of the present disclosure.

DETAILED DESCRIPTION OF THE EMBODIMENT

Figure 2B:
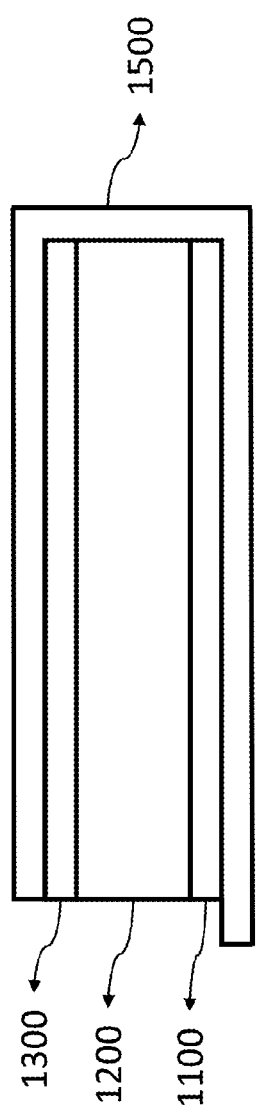
FIG. 2B is a module structure of the finger navigation module made by the simple manufacturing method according to one embodiment of the present disclosure.

It should be noted that, wherever possible, the same reference numbers will be used throughout the drawings to refer to the same or like parts.

The present disclosure provides a capacitive finger navigation module including a contact layer for a finger to perform a move operation or a press operation thereon, a first electrode layer having at least one first electrode, a second electrode layer having at least one second electrode and at least one third electrode, and an elastic material layer disposed between the first electrode layer and the second electrode layer and configured to form a deformation in a finger press so as to change a distance between the first electrode layer and the second electrode layer, wherein there exists an inductive capacitor between the first electrode and the second electrode configured to detect the finger press and generate a press signal, and there exists an inductive capacitor between the second electrode and the third electrode configured to detect a finger movement and generate a movement signal.

Referring to FIG. 1, it is a module structure according to one embodiment of the present disclosure. The capacitive finger navigation module 1000 includes a first electrode layer 1100, an elastic material layer 1200, a second electrode layer 1300 and a contact layer 1400, wherein the contact layer 1400 is preferably made of nonconductive material and for a finger to perform a press operation thereon.

The first electrode layer 1100 has at least one first electrode (not shown) and the second electrode layer 1300 has at least one second electrode (not shown), wherein the elastic material layer 1200 is sandwiched between the first electrode layer 1100 and the second electrode layer 1300 to define a height between the first electrode layer 1100 and the second electrode layer 1300. When a finger performs a press operation on the contact layer 1400, the elastic material layer 1200 deforms to change a distance between the first electrode layer 1100 and the second electrode layer 1300 thereby further influencing the inductive capacitance therebetween. For example, when the finger presses a specific region of the finger navigation module 1000, a distance between the first electrode and the second electrode under the specific region is changed such that the inductive capacitor between a part of the first electrode and the second electrode is changed. The region pressed by the finger is calculated according to a capacitance change formed by these inductive capacitors and a press signal is generated accordingly.

The press signal may be a cursor control signal for providing a continuous cursor movement command. For example, when a finger presses a left area of the contact layer 1400, the press signal may be a command to continuously move the cursor leftward, and when the finger stops pressing on the area, the command is stopped being outputted or a command to stop moving the cursor is generated. For example, when the capacitance change exceeds a change threshold, a cursor movement command is generated; whereas when the capacitance change is lower than the change threshold, the outputting of the cursor movement command is stopped or a cursor cease command is generated, wherein the degree of a finger press may further be identified according to a number of the first and second electrodes influenced by the finger press. When the number of the first and second electrodes being influenced is higher, the pressure of the finger press is larger; whereas when the number of the first and second electrodes being influenced is smaller, the pressure of the finger press is smaller. Accordingly, the pressure and the direction of the finger press are identifiable according to the signal change detected between the first electrode and the second electrode.

In one embodiment, the contact layer 1400 is further disposed with a plurality of conductive areas, and these conductive areas are electrically connected to the electrode of the second electrode layer 1300 under the conductive areas respectively. For example, when the second electrode layer 1300 is disposed with the driving electrode, 4 (only intended to illustrate the present disclosure but not limited to) driving electrodes are disposed in the whole second electrode layer 1300, and each of the 4 driving electrodes is electrically connected to one or a plurality of conductive areas of the contact layer 1400 respectively. Furthermore, the conductive areas may be convex lumps for providing the user a better operating experience.

Figure 2C:
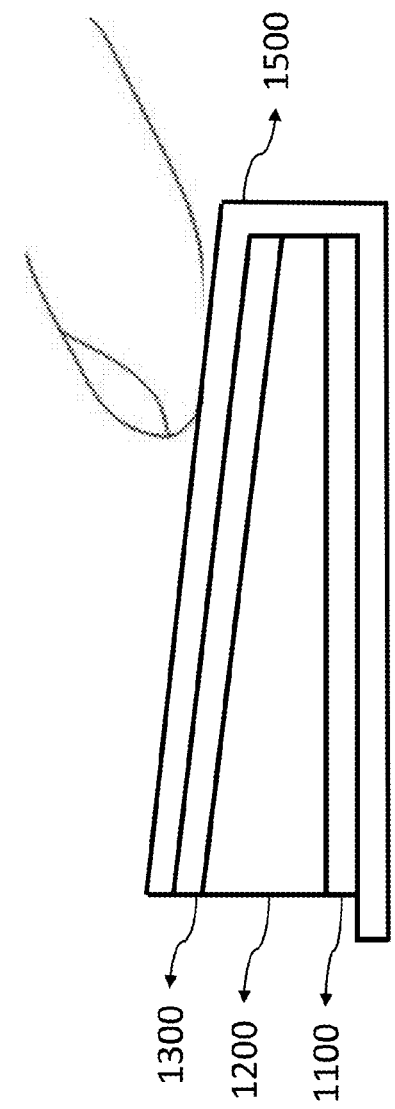
FIG. 2C is a schematic diagram of the finger navigation module made by the simple manufacturing method under press according to one embodiment of the present disclosure.

The finger navigation module 1000 may be manufactured by a simple manufacturing method. Referring to FIG. 2A, it is a schematic diagram of a simple manufacturing method of the finger navigation module according to one embodiment of the present disclosure, wherein the first electrode layer 1100 and the second electrode layer 1300 are directly formed on a flexible board 1500, and after the elastic material layer 1200 is directly arranged upon the first electrode layer 1100 and/or the second electrode layer 1300, the flexible board 1500 is bended so as to form the structure shown in FIG. 2B. The region of flexible board 1500 corresponding to the second electrode layer 1300 may further replace the contact layer 1400 for providing the user to perform a contact operation thereon. In other words, the contact layer 1400 is directly a part of the flexible board 1500 (e.g. a part corresponding to the second electrode 1300 herein) or an additional layer. Referring to FIG. 2C, it shows that when a finger presses on one place of the finger navigation module 1000, the second electrode layer 1300 is pressed and tilted so as to increase the inductive capacitance detected by a part of the first electrode or the second electrode.

Figure 2D:
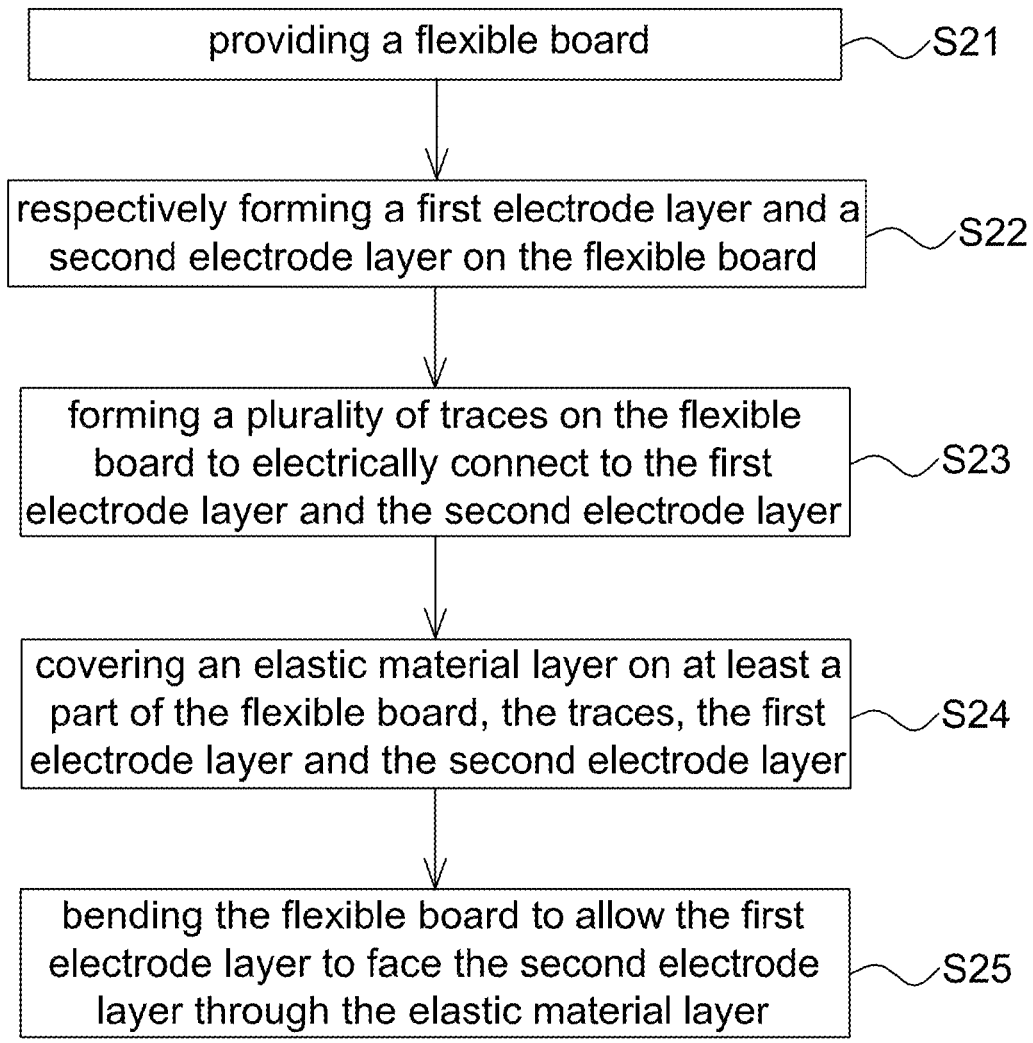
FIG. 2D is a flow chart of the simple manufacturing method of the finger navigation module according to one embodiment of the present disclosure.

FIG. 2D is a flow chart of the simple manufacturing method of the finger navigation module according to one embodiment of the present disclosure, which includes the steps of: providing a flexible board (Step S21); respectively forming a first electrode layer and a second electrode layer on the flexible board (Step S22); forming a plurality of traces on the flexible board to electrically connect to the first electrode layer and the second electrode layer (Step S23); covering an elastic material layer on at least a part of the flexible board, the traces, the first electrode layer and the second electrode layer (Step S24); and bending the flexible board to allow the first electrode layer to face the second electrode layer through the elastic material layer (Step S25).

In the Step S22, the first electrode layer 1100 and the second electrode layer 1300 are respectively formed at two sides of a bending area 1510 of the flexible board as shown in FIG. 2A, wherein the first electrode layer 1100 may include a plurality of sensing electrodes and the second electrode layer 1300 may include at least one driving electrode (as shown in FIGS. 3A and 3B). It is appreciated that the first electrode layer 1100 may be disposed with the driving electrode and the second electrode layer 1300 may be disposed with the sensing electrode.

In the Step S24, the elastic material layer covers, for example, only the left side or the right side of the bending area 1510 at first, and then the Step S25 is entered; or the elastic material layer covers both the left side and the right side of the bending area 1510 at first, and then the Step S25 is entered without particular limitation.

FIGS. 3A and 3B are schematic diagrams of the electrode arrangement according to some embodiments of the present disclosure. As shown in FIGS. 3A and 3B, the first electrode layer 1100 disposed on one side of the flexible board 1500 is sensing electrodes arranged in a 4×4 matrix, and the second electrode layer 1300 disposed on the other side of the flexible board 1500 is the driving electrode(s), wherein a single driving electrode is shown in FIG. 3A and driving electrodes arranged in a 4×4 matrix is shown in FIG. 3B. The bending area 1510 in FIGS. 3A and 3B is for directly bending the flexible board 1500 so as to form the module structure shown in FIG. 2B.

In one embodiment, when the first electrode layer 1100 includes the sensing electrodes, which are arranged in a matrix as shown in FIGS. 3A and 3B, and the second electrode 1300 includes the driving electrode(s), and when the finger presses on the contact layer 1400, each of the sensing electrodes in the matrix may independently detect the inductive capacitance change generated by a distance change from the driving electrode. Accordingly, the finger navigation module may identify the direction and pressure of the finger press according to the number and the position of the sensing electrodes generating the inductive capacitance change.

More specifically, in the finger navigation module 1000 of this embodiment, the first electrode layer 1100 includes a plurality of sensing electrodes, and the second electrode layer 1300 includes at least one driving electrode (e.g. the single driving electrode in FIG. 3A and the plurality of driving electrodes in FIG. 3B) corresponding to the sensing electrodes. It should be mentioned that, the arrangements of the driving electrode and the sensing electrodes in FIGS. 3A and 3B are only intended to illustrate but not to limit the present disclosure.

In addition, the capacitive finger navigation module 1000 may further include a processing unit 1600 electrically connected to the first electrode layer 1100 and the second electrode layer 1300 (more specifically to the sensing electrode and the driving electrode) through a plurality of traces. In one embodiment, the processing unit 1600 is configured to generate a strength signal and a direction signal to be served as a cursor control signal according to the inductive capacitance change detected by the sensing electrodes in the press operation, wherein the cursor control signal may be used to relatively control a cursor on a screen (not shown). For example, the strength signal indicates a degree of the finger press for controlling a cursor moving speed, and the direction signal is for controlling a cursor moving direction.

In one embodiment, the processing unit 1600 is configured to determine the strength signal according to an electrode number of the sensing electrodes which detect the inductive capacitance change exceeding a change threshold, and determine the direction signal according to an electrode position of the sensing electrodes which detect the inductive capacitance change exceeding the change threshold, wherein when the electrode number with the inductive capacitance change exceeding a change threshold is larger than 1, the electrode position is determined according to, for example, a geometric center of a plurality of sensing electrodes, a sensing electrode having the largest inductive capacitance change or a position calculated using the interpolation, but not limited thereto.

In another embodiment, the function of the plurality of sensing electrodes is separable. For example, the processing unit 1600 is configured to generate the strength signal and the direction signal according to the inductive capacitance change detected by a first part of the sensing electrodes, and to generate a click signal according to the inductive capacitance change detected by a second part of the sensing electrodes. For example in one embodiment, the first part is an edge part of the second electrode layer 1300 and the second part is a central part of the second electrode layer 1300, but not limited thereto. In addition, in separating different functions, the sensing electrodes between different functional regions may have no function so as to distinguish different functions.

In the above embodiment, the first electrode layer and the second electrode layer may be referred to the driving electrode layer when only including the driving electrode whereas referred to the sensing electrode layer when only including the sensing electrode.

Figure 4:
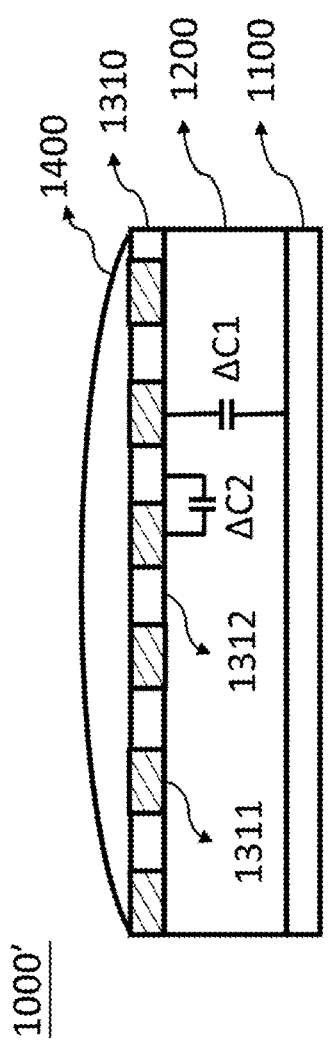
FIG. 4 is a module structure according to another embodiment of the present disclosure.

FIG. 4 is a module structure according to another embodiment of the present disclosure. Different from the embodiment shown in FIG. 1, in this embodiment the second electrode layer 1310 includes at least one second electrode 1311 and at least one third electrode 1312. The second electrode 1311 and the third electrode 1312 are not electrically connected (i.e. electrically separated), and an inductive capacitor is formed therebetween. When a finger approaches or touches the contact layer 1400, the inductive capacitor between the second electrode 1311 and the third electrode 1312 is influenced, and the capacitance formed by this inductive capacitor is also influenced. The region that the finger passes is calculated according to the capacitance change generated by these inductive capacitors to accordingly generate a single finger movement signal.

In one embodiment, the first electrode layer 1100 of FIG. 4 is preferable the driving electrode, the second electrode 1311 of the second electrode layer 1310 is the sensing electrode, and the third electrode 1312 of the second electrode layer 1310 is the driving electrode. When the finger is moving on the contact surface 1400, the electric field between the second electrode 1311 and the third electrode 1312 nearby is influenced to further change the inductive capacitance detected by the associated second electrode 1311 such that the moving direction, moving speed and sliding locus of the finger is identifiable. When the finger presses on the contact surface 1400, a distance between the associated second electrode 1311 and the first electrode 1100 is changed to further influence the electric field between the two electrodes thereby changing the inductive capacitance detected by the second electrode 1311.

More specifically, in this embodiment the contact layer 1400 provides a move operation and a press operation of a finger thereon. The elastic material layer 1200 is also disposed between the first electrode layer 1100 and the second electrode layer 1310 configured to form a deformation in the press operation thereby changing a distance between the first electrode layer 1100 and the second electrode layer 1310. Therefore, in the capacitive finger navigation module 1000' of this embodiment, in the press operation the first electrode 1100 and the second electrode 1311 are configured to generate a press signal according to a first inductive capacitance change $\Delta C1$, and in the move operation the second electrode 1311 and the third electrode 1312 are configured to generate a movement signal according to a second inductive capacitance change $\Delta C2$.

When the inductive capacitance detected by the second electrode 1311 is increasing and higher than a value without any inductive capacitance change, it is identified that an inductive capacitance increment is caused by the distance decrement between the first electrode layer 1100 and the second electrode layer 1300/1310 due to the finger press. In addition, when the inductive capacitance detected by the second electrode 1311 is decreasing and lower than the value without any inductive capacitance change, it is identified that an inductive capacitance decrement detected by the second electrode 1311 is caused by the inductive capacitor decrement between the second electrode 1311 and the third electrode 1312 due to the finger touching or approaching the contact layer 1400.

In another embodiment, the first electrode layer 1100 of FIG. 4 is disposed with the sensing electrode such that the detected signal of the first electrode layer 1100 is directly configured to identify the degree, position and/or direction of the finger press, and the detected signal of the second electrode 1311 of the second electrode layer 1310 is configured to identify the position of the approaching or touching of the finger.

For example, the finger navigation module 1000' of this embodiment is also coupled to a processing unit 1600 for generating a continuous movement signal according to the press signal, wherein the processing unit 1600 may be integrated in the finger navigation module 1000' or included in an external device, e.g. a host.

Figure 4B:
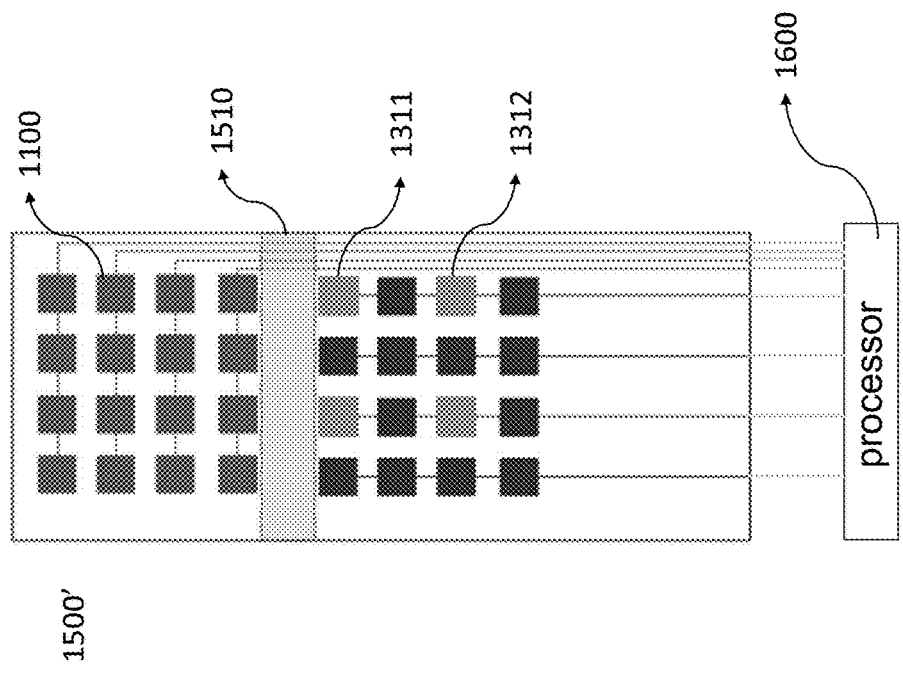
FIG. 4B is a schematic diagram of the electrode arrangement according to another embodiment of the present disclosure.
Figure 4A:
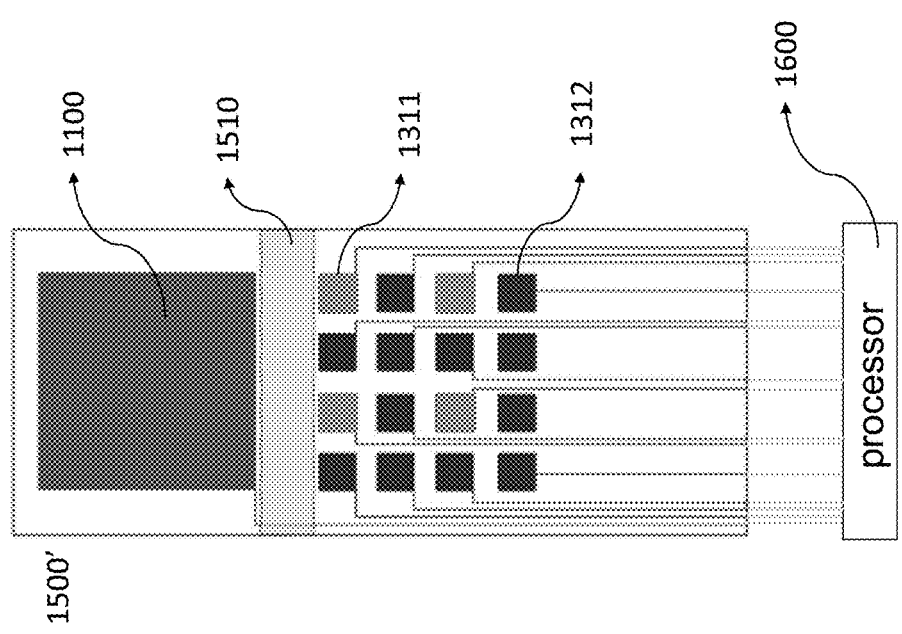
FIG. 4A is a schematic diagram of the electrode arrangement according to one embodiment of the present disclosure.

As shown in FIGS. 4A and 4B, the second electrode layer 1310 includes a plurality of sensing electrodes (e.g. the second electrodes 1311) respectively configured to generate a press signal when the first inductive capacitance change $\Delta C1$ exceeds a change threshold, and the processing unit 1600 is further configured to determine a moving speed of the continuous movement signal according to an electrode number generating the press signal. For example, when the press signal is configured to relatively control a cursor motion or output strength, a higher electrode number indicates a larger pressure of the finger press, and the cursor moving speed is faster or the output strength is stronger. On the contrary, a lower electrode number indicates a smaller pressure of the finger press, and the cursor moving speed is slower or the output strength is weaker. In addition, the processing unit 1600 is further configured to determine a moving direction of the continuous movement signal according to an electrode position generating the press signal. For example, when the press signal is configured to control a cursor motion, the moving direction may determine a cursor moving direction. The change threshold may be determined previously.

As mentioned above, the function corresponding to a plurality sensing electrodes is separable. For example, the processing unit 1600 is configured to generate the continuous movement signal according to the press signal of a first part of the second electrodes 1311, and generate a click signal according to the press signal of a second part of the second electrodes 1311. Similarly, the first part may be an edge part of the second electrode layer 1310 and the second part may be a central part of the second electrode layer 1310, but not limited thereto.

According to the module structure of FIG. 4, a press and a sliding position are detectable simultaneously by using a single finger navigation module, and functions of the cursor movement, mouse left key, mouse right key or other gestures for the cursor or associated software may be generated according to the operation system. Incorporating multiple parameters may provide various user experiences, e.g. providing pressure during the finger sliding by the user, controlling a role in the game interface to move and attack simultaneously, associating the increasing or decreasing of the press pressure with the attacking strength or weapon change and so on.

In addition, in order to be adaptable to portable electronic devices, the finger navigation module 1000' of this embodiment is smaller than a finger surface (e.g. within an area of 8 mm×8 mm), and the contact layer 1400 is preferably formed as a curved surface (e.g. a convex surface or a concave surface) such that a finger does not simultaneously contact all the second electrodes 1311 and the third electrodes 1312 of the second electrode layer 1310 when putting the finger on the contact layer 1400. The movement operation of the finger on the contact layer 1400 may be realized easier.

As mentioned above, the finger navigation module 1000' of this embodiment may also be manufactured by the manufacturing method of FIG. 2D, i.e. a first electrode layer 1100 and a second electrode layer 1310 being respectively formed at two sides of a bending area 1510 of a flexible board 1500' as shown in FIGS. 4A and 4B. Similarly, the contact layer 1400 may directly be a part of the flexible board 1500' or an additional layer.

In this embodiment, the first electrode layer 1100 includes at least one first electrode, and the second electrode layer includes at least one second electrode 1311 and at least one third electrode 1312, wherein the second electrode 1311 and the third electrode 1312 are electrically separated and respectively connected to different voltages. In one embodiment, the second electrode 1311 is a driving electrode, and the first electrode 1100 and the third electrode 1312 are sensing electrodes. In another embodiment, the second electrode 1311 is a sensing electrode, and the first electrode 1100 and the third electrode 1312 are driving electrodes. In addition, as the driving electrode is configured to generate the driving signal and the sensing electrode is configured to output the sensing signal, an electrode number of the driving electrode may be 1, but a plurality of driving electrodes may be arranged according to different applications. The electrode number of the sensing electrode is preferably larger than 1 so as to be able to detect the inductive capacitance change at different positions.

In addition, in this embodiment as the processing unit 1600 may generate a continuous movement signal according to the press signal and generate a single movement signal according to the second inductive capacitance change ΔC2, the processing unit 1600 may control a cursor motion only according to one of the continuous movement signal and the single movement signal. For example, when the processing unit 1600 detects the continuous movement signal, the single movement signal is ignored, or vice versa. However, when the press signal is for other functions, e.g. the click signal, the processing unit 1600 may execute respective operations according to the press signal and the movement signal simultaneously. Said single movement signal is referred to that generated by the user moving a finger on the contact layer 1400.

In one embodiment, said continuous movement signal is generated by the user pressing on the contact layer 1400, and in this case the user may continuously move the cursor over a predetermined distance or a predetermined time at a moving speed without moving the finger position on the contact layer 1400, wherein said moving speed is determined according to the finger pressure, and the moving distance of the cursor may have a predetermined ratio relationship with respect to the moving distance of the finger.

Figure 5B:
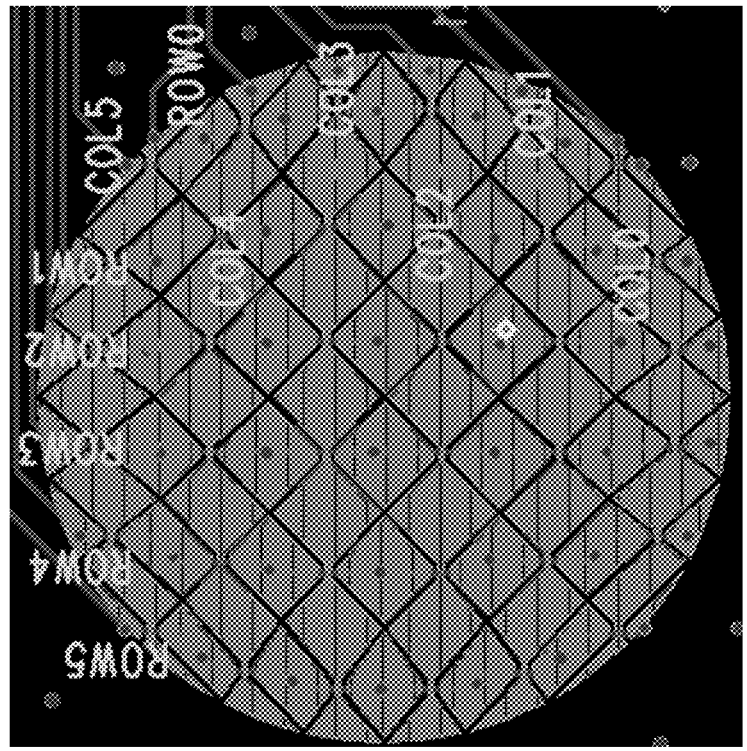
FIG. 5B is a schematic diagram of the sensing electrodes after adjustment according to one embodiment of the present disclosure.
Figure 5A:
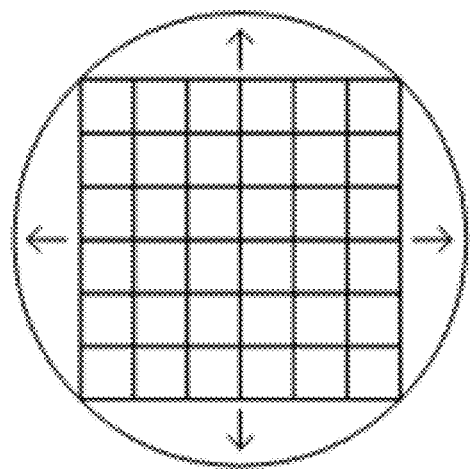
FIG. 5A is a schematic diagram of the sensing electrodes before adjustment according to one embodiment of the present disclosure.

FIG. 5A is a schematic diagram of the sensing and driving electrodes before adjustment according to one embodiment of the present disclosure, and FIG. 5B is a schematic diagram of the sensing and driving electrodes after adjustment according to one embodiment of the present disclosure. For operating convenience, the finger navigation module is arranged to have a dome shape. Referring to FIG. 5A, when the sensing electrodes and the driving electrodes are arranged in a matrix, the sensing electrodes and the driving electrodes are not fully corresponding to the contact layer. Accordingly, when the sensing electrodes and the driving electrodes are arranged as N×N matrix, the sensing electrodes close to the edge are arranged to have an irregular shape as shown in FIG. 5B such that when the finger touches any position of the dome-shaped contact layer, the corresponding sensing electrodes may generate substantial identical inductive capacitance change. More specifically, a part of the plurality of second electrodes 1311 included in the second electrode layer 1310 have different areas (or shapes) from one another and/or a part of the plurality of third electrodes have different areas (or shapes) from one another, and the second electrodes 1311 and the third electrodes 1312 at the central part may have substantial identical areas (or shapes). In this manner, as most displays have a rectangular shape, arranging smaller electrodes at the edge area of the circular arranged electrodes as shown in FIG. 5B allows the user to be able to cross one sensing cell, e.g. formed by a pair of driving and sensing electrodes, by moving the finger over a small distance at the edge area so as to compensate the mismatch between the circular arranged electrodes and the rectangular display which causes multiple slides are necessary at the edge area.

Figure 6A:
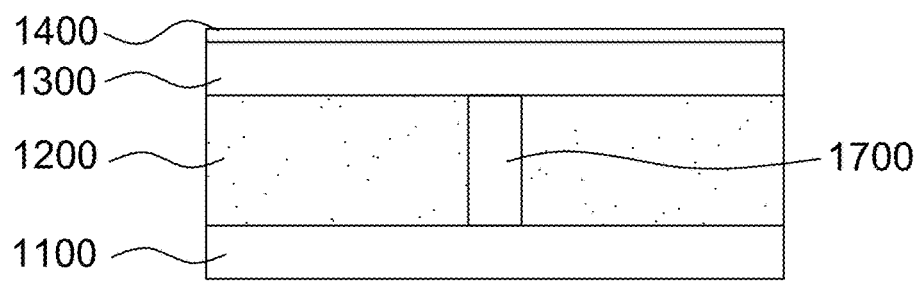
FIGS. 6A-6C are module structures according to other embodiments of the present disclosure.
Figure 6B:
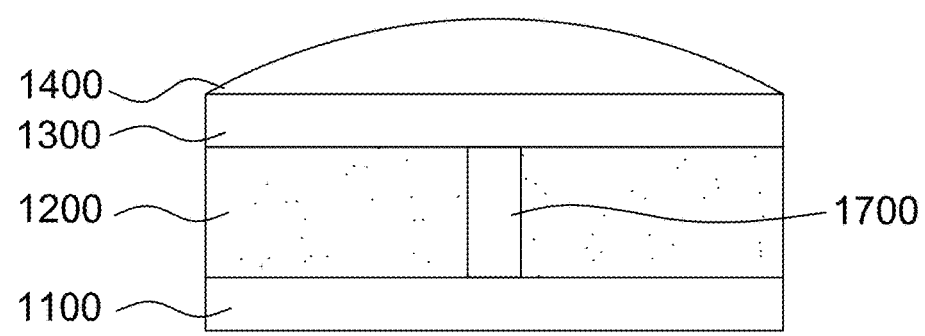
Figure 6C:
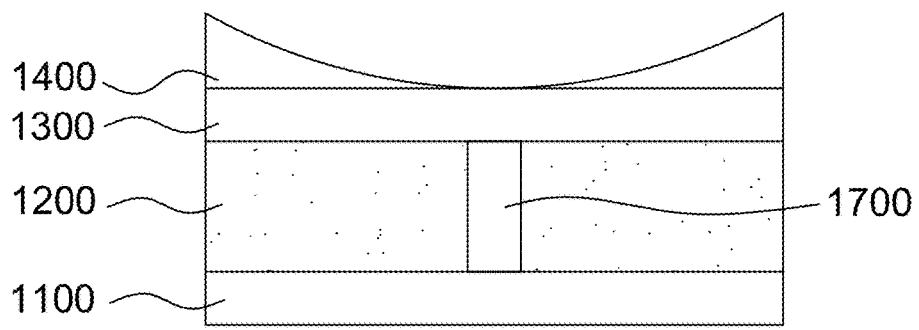

Referring to FIGS. 6A to 6C, they are capacitive finger navigation modules according to other embodiments of the present disclosure. The difference between FIGS. 6A-6C and FIGS. 1, 2B and 4 is that there is a supporting member 1700 further included in the elastic material layer 1200 configured to support between the first electrode layer 1100 and the second electrode layer 1300. In one embodiment, the supporting member 1700 locates at a center of the elastic material layer 1200. In some embodiments, the position of the supporting member 1700 is determined according to different applications. In addition, in the capacitive finger navigation module of this embodiment, a surface of the contact layer 1400 for being touched by the user may be a plane surface (e.g. FIG. 6A), a convex surface (e.g. FIG. 6B) or a concave surface (e.g. FIG. 6C) without particular limitation.

In one embodiment, electrode arrangements of the first electrode layer 1100 and the second electrode layer 1300 are identical to those in the above embodiments (e.g. FIGS. 3A-3B, 4, 4A-4B and 5B) configured to detect the press operation and/or the movement operation.

Figure 8:
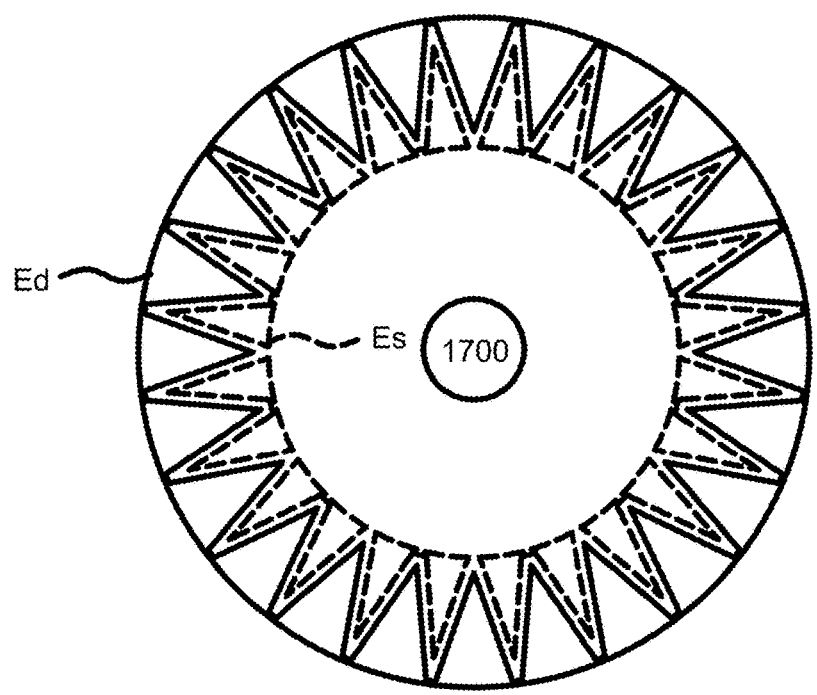
FIG. 8 is a schematic diagram of the electrode arrangement according to another embodiment of the present disclosure.

In this embodiment, as there is included the supporting member 1700, only the edge of the first electrode layer 1100 and the second electrode layer 1300 may close to each other, and the capacitance change of a small region is generated so as to facilitate the calculation of the touch point. Accordingly in some embodiments, the electrodes in the first electrode layer 1100 and the second electrode layer 1300 are only arranged close to the edge, and the surrounding of the supporting member 1700 is not disposed with the driving electrode or the sensing electrode. For example in FIGS. 3A-3B and 4A-4B, only the electrodes close to the edge are formed. In another embodiment, the electrode in the first electrode layer 1100 is formed as shown in FIG. 8, wherein Ed indicates the driving electrode, Es indicates the sensing electrode, and 1700 indicates the disposed position of the supporting member, and the element ratio in FIG. 8 is only intended to illustrate but not to limit the present disclosure.

In another embodiment, the second electrode layer 1300 is not disposed with any electrode, and the first electrode layer 1100 is disposed with both the sensing electrode and the driving electrode (e.g. FIG. 8), and the second electrode layer 1300 and the supporting member 1700 are made of conductive material. Accordingly, when the edge of the second electrode layer 1300 is pressed to close to the first electrode layer 1100, the capacitance change is induced at the first electrode layer 1100, wherein an end of the supporting member 1700 disposed at the first electrode layer 1100 is electrically separated from the first electrode layer 1100.

In manufacturing the capacitive finger navigation module as shown in FIGS. 6A-6C, a step of disposing the supporting member 1700 is further added in FIG. 2D. For example, this step may be inserted between the Steps S22 and S23 or between the Steps S23 and 24 such that the capacitive finger navigation module may also be manufactured by a simple way.

Figure 7A:
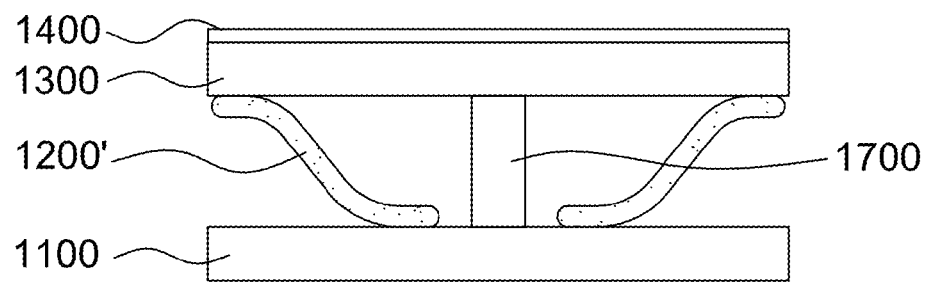
FIGS. 7A-7C are module structures according to other embodiments of the present disclosure.
Figure 7B:
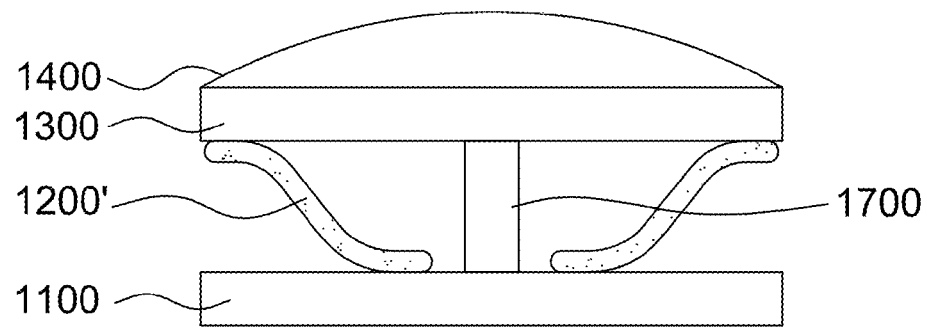
Figure 7C:
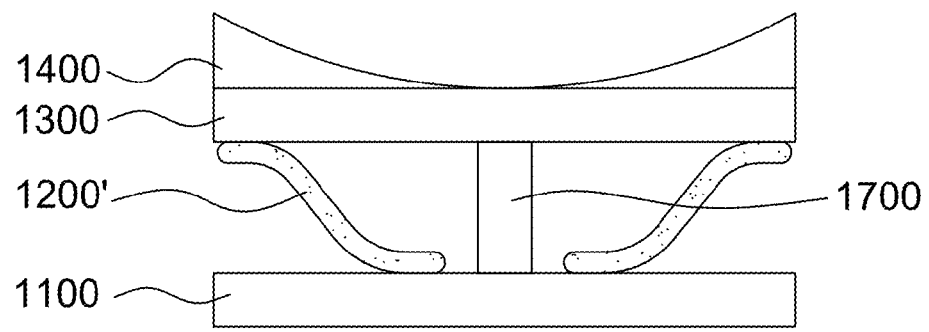

In another embodiment, the elastic material layer 1200 may be replaced by other elastic member 1200' as shown in FIGS. 7A-7C, wherein the elastic member 1200' is made of nonconductive material and pushes against between the first electrode layer 1100 and the second electrode layer 1300 without particular limitation as long as a deformation is formed under press and the original state is recovered when the external force is removed. The elastic member 1200' may be made of rubber or sponge. In some embodiments, for maintaining balance a plurality of elastic members 1200' separated by an identical distance from each other are disposed surrounding the supporting member 1700. In addition to the elastic member 1200', the operation and the electrode arrangement of the capacitive finger navigation module of this embodiment are identical to those in the above embodiments. For example in some embodiments, the first electrode layer 1100 and the second electrode layer 1300 of FIGS. 7A-7C are both disposed with electrodes as shown in FIGS. 3A, 3B, 4A and 4b, but not limited thereto. In other embodiments, the second electrode layer 1300 in FIGS. 7A-7C is not disposed with any electrode, and both the sensing electrode and the driving electrode are disposed in the first electrode layer 1100 (e.g. FIG. 8), but not limited thereto. Similarly, in some embodiments the areas surrounding the supporting member 1700 in the first electrode layer 1100 and the second electrode layer 1300 are not arranged with any electrode, and the driving electrode and the sensing electrode are only arranged close to outer edges of the electrode layers.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A capacitive finger navigation module comprising:
   a contact layer configured for providing a move operation and a press operation of a finger thereon;
   a first electrode layer comprising at least one sensing electrode;
   a second electrode layer comprising at least one sensing electrode and at least one driving electrode; and
   an elastic material layer, disposed between the first electrode layer and the second electrode layer, configured to be deformed in the press operation so as to change a distance between the first electrode layer and the second electrode layer,
   wherein the sensing electrode of the first electrode layer and the driving electrode of the second electrode layer are on opposing sides of the elastic material layer, and upon a user's finger pressing the contact layer and deforming the elastic material layer, the sensing electrode of the first electrode layer and the driving electrode of the second electrode layer are configured to generate a press signal according to a first inductive capacitance change to thereby detect the press operation, and
   the driving and sensing electrodes of the second electrode layer are on a same layer of the second electrode layer and are configured to generate a movement signal according to a second inductive capacitance change responsive to the user's finger touching the contact layer to thereby detect the move operation.

2. The capacitive finger navigation module as claimed in claim 1, further comprising:
   a flexible board,
   wherein the first electrode layer is formed on a first portion of the flexible board and the second electrode layer is formed on a second portion of the flexible board to be in longitudinally spaced relationship with respect to the first electrode layer, the first and second electrode layers being disposed in a same layer on the flexible board, and
   a bending area is formed on the flexible board, the bending area being located between the first and second portions of the flexible board, and the flexible board being folded about the bending area to position the first electrode layer and the second electrode layer in facing correspondence on opposing sides of the elastic material layer.

3. The capacitive finger navigation module as claimed in claim 1, wherein a number of the driving electrodes of the second electrode layer is larger than or equal to 1, and a number of the sensing electrodes of the second electrode layer is larger than 1.

4. The capacitive finger navigation module as claimed in claim 1, wherein the second electrode layer comprises a plurality of sensing electrodes and a plurality of driving electrodes, and a predetermined number of the driving electrodes of the second electrode layer have different areas from one another, and a predetermined number of the sensing electrodes of the second electrode layer have different areas from one another.

5. The capacitive finger navigation module as claimed in claim 1, wherein the capacitive finger navigation module is coupled to a processing unit, and the processing unit is configured to generate a continuous movement signal according to the press signal.

6. The capacitive finger navigation module as claimed in claim 5, wherein
   the first electrode layer comprises a plurality of sensing electrodes, the sensing electrodes of the first electrode layer being configured to generate the press signal when the first inductive capacitance change exceeds a change threshold, and
   the processing unit is further configured to determine a moving speed of the continuous movement signal according to a number of the sensing electrodes of the first electrode layer generating the press signal.

7. The capacitive finger navigation module as claimed in claim 5, wherein the first electrode layer comprises a plurality of sensing electrodes, the sensing electrodes of the first electrode layer being configured to generate the press signal when the first inductive capacitance change exceeds a change threshold, and the processing unit is further configured to determine a moving direction of the continuous movement signal according to a position of the sensing electrodes of the first electrode layer generating the press signal.

8. The capacitive finger navigation module as claimed in claim 1, further comprising a supporting member disposed inside the elastic material layer and supporting between the first electrode layer and the second electrode layer.

9. The capacitive finger navigation module as claimed in claim 1, further comprising a flexible board configured to arrange the first electrode layer and the second electrode layer, wherein the contact layer is a part of the flexible board.

10. A capacitive finger navigation module comprising:
a contact layer configured for providing a press operation of a finger thereon;
a first electrode layer comprising a plurality of driving electrodes;
a second electrode layer comprising at least one driving electrode and at least one sensing electrode;
an elastic material layer, disposed between the first electrode layer and the second electrode layer, wherein the driving electrodes of the first electrode layer and the sensing electrode of the second electrode layer are on opposing sides of the elastic material layer, and the sensing and driving electrodes of the second electrode layer are on a same layer of the second electrode layer, the elastic material layer being configured to be deformed in the press operation so as to change a distance between the driving electrodes of the first electrode layer and the sensing electrode of the second electrode layer; and
a processing unit configured to generate, in the press operation, a strength signal and a direction signal according to an inductive capacitance change sensed by the sensing electrodes of the second electrode layer.

11. The capacitive finger navigation module as claimed in claim 10, wherein the strength signal is configured to control a cursor moving speed and the direction signal is configured to control a cursor moving direction.

12. The capacitive finger navigation module as claimed in claim 10, wherein the processing unit is configured to
determine the strength signal according to a number of the sensing electrodes of the second electrode layer with the inductive capacitance change exceeding a change threshold, and
determine the direction signal according to a position of the sensing electrodes of the second electrode layer with the inductive capacitance change exceeding the change threshold.

13. The capacitive finger navigation module as claimed in claim 10, further comprising a supporting member disposed inside the elastic material layer and supporting between the first and second electrode layers.

14. The capacitive finger navigation module as claimed in claim 10, further comprising a flexible board configured to arrange the first and second electrode layers, wherein the contact layer is a part of the flexible board.

15. The capacitive finger navigation module as claimed in claim 10, wherein the contact layer further comprises a plurality of conductive areas electrically connected to the driving electrodes of the second electrode layer.

16. The capacitive finger navigation module as claimed in claim 10, further comprising:
a flexible board,
wherein the first electrode layer is formed on a first portion of the flexible board and the second electrode layer is formed on a second portion of the flexible board to be in longitudinally spaced relationship with respect to the first electrode layer, the first and second electrode layers being disposed in a same layer on the flexible board, and
a bending area is formed on the flexible board, the bending area being located between the first and second portions of the flexible board, and the flexible board being folded about the bending area to position the first electrode layer and the second electrode layer in facing correspondence on opposing sides of the elastic material layer.

17. A manufacturing method of a capacitive finger navigation module, the manufacturing method comprising:
providing a flexible board which has a bending area, wherein the flexible board is foldable about the bending area;
forming a first electrode layer on a first portion of the flexible board, and forming a second electrode layer on a second portion of the flexible board to be in longitudinally spaced relationship with respect to the first electrode layer, the first and second electrode layers being disposed in a same layer on the flexible board;
forming a plurality of traces on the flexible board to electrically connect to the first electrode layer and the second electrode layer;
covering an elastic material layer on at least a portion of the traces, and at least one of the first electrode layer and the second electrode layer; and
folding the flexible board about the bending area to thereby position the first electrode layer and the second electrode layer in facing correspondence on opposing sides of the elastic material layer.

18. The manufacturing method as claimed in claim 17, wherein the first electrode layer comprises at least one first electrode, the second electrode layer comprises at least one second electrode and at least one third electrode, the second electrode being electrically separated from the third electrode, and the first and second electrodes being formed on opposing sides of the elastic material layer, and the second and third electrodes being formed on the same side of the elastic material layer.

19. The manufacturing method as claimed in claim 18, wherein
the second electrode is a driving electrode, and the first and third electrodes are sensing electrodes, or
the second electrode is a sensing electrode, and the first and third electrodes are driving electrodes.

20. The manufacturing method as claimed in claim 17, wherein
the first electrode layer comprises a plurality of sensing electrodes and the second electrode layer comprises at least one driving electrode, or
the first electrode layer comprises at least one driving electrode and the second electrode layer comprises a plurality of sensing electrodes.

* * * * *